(12) United States Patent
Rueckert et al.

(10) Patent No.: US 8,834,991 B2
(45) Date of Patent: Sep. 16, 2014

(54) TEXTURIZED MOTTLED ARTIFICIAL CLOTHING LABEL AND METHODS OF MAKING THE SAME

(71) Applicant: Neenah Paper, Inc., Alpharetta, GA (US)

(72) Inventors: Cheryl B. Rueckert, Au Train, MI (US); Rhonda S. Lassila, Wetmore, MI (US)

(73) Assignee: Neenah Paper, Inc., Alpharetta, GA (US)

( * ) Notice: Subject to any disclaimer, the term of this patent is extended or adjusted under 35 U.S.C. 154(b) by 0 days.

(21) Appl. No.: 13/800,736

(22) Filed: Mar. 13, 2013

(65) Prior Publication Data

US 2013/0196116 A1 Aug. 1, 2013

Related U.S. Application Data

(62) Division of application No. 12/713,269, filed on Feb. 26, 2010, now Pat. No. 8,419,878.

(51) Int. Cl.
*B32B 3/00* (2006.01)
*B32B 7/00* (2006.01)
(Continued)

(52) U.S. Cl.
CPC ............... *B32B 27/10* (2013.01); *D21H 27/40* (2013.01); *B32B 2519/00* (2013.01); *B32B 2307/726* (2013.01); *B32B 3/30* (2013.01); *B32B 2307/7145* (2013.01); *B32B 2307/734* (2013.01); *B32B 2307/75* (2013.01); *B32B 38/06* (2013.01); *B32B 27/04* (2013.01);
(Continued)

(58) Field of Classification Search
USPC ............ 428/41.6, 42.1, 172, 206, 207, 211.1, 428/212, 537.5; 40/674, 675; 283/81
See application file for complete search history.

(56) References Cited

U.S. PATENT DOCUMENTS 3,556,932 A 1/1971 Coscia et al.
3,556,933 A 1/1971 Williams et al.
(Continued)

FOREIGN PATENT DOCUMENTS

EP 0355829 2/1990
GB 1455461 11/1976
(Continued)

OTHER PUBLICATIONS

International Search Report for Application No. PCT/US2010/054207.

*Primary Examiner* — Donald J Loney
(74) *Attorney, Agent, or Firm* — Dority & Manning, P.A.

(57) ABSTRACT

Laminates and methods of making them are generally provided. The methods of making a laminate for use as a clothing tag can include laminating a first fibrous web to a second fibrous web. Both the first and second fibrous webs can include cellulosic fibers and a binder composition present in the respective fibrous web from about 10% by weight to about 100% by weight of the dry weight of the fibrous web. Both the first and second binder composition can include a curable latex polymer and a crosslinker. The second fibrous web can be creped and can have a thickness less than 10 mils. The laminate can be aged for at least about 1 hour at an aging temperature of greater than about 150° F. The resulting laminated and their use in clothing are also provided.

7 Claims, 2 Drawing Sheets

(51) Int. Cl.
  *G09F 3/04*   (2006.01)
  *D21H 27/40*  (2006.01)
  *B32B 3/30*   (2006.01)
  *B32B 27/10*  (2006.01)
  *B32B 27/04*  (2006.01)
  *B32B 25/02*  (2006.01)
  *D21H 27/38*  (2006.01)
  *B32B 7/12*   (2006.01)
  *B32B 27/30*  (2006.01)
  *B32B 25/14*  (2006.01)
  *D21H 27/30*  (2006.01)
  *B32B 29/06*  (2006.01)
  *D21H 27/32*  (2006.01)
  *B32B 38/06*  (2006.01)
  *B32B 37/12*  (2006.01)

(52) U.S. Cl.
  CPC ............ *B32B 25/02* (2013.01); *D21H 27/38* (2013.01); *B32B 2317/125* (2013.01); *B32B 7/12* (2013.01); *B32B 27/30* (2013.01); *B32B 37/12* (2013.01); *B32B 2307/724* (2013.01); *B32B 25/14* (2013.01); *B32B 2307/554* (2013.01); *D21H 27/30* (2013.01); *B32B 29/06* (2013.01); *D21H 27/32* (2013.01); *B32B 2307/5825* (2013.01)
  USPC ......... 428/172; 428/41.6; 428/42.1; 428/206; 428/207; 428/211.1; 428/212; 428/537.5; 283/81; 40/675

(56) References Cited

U.S. PATENT DOCUMENTS

| | | |
|---|---|---|
| 3,700,623 A | 10/1972 | Keim |
| 3,772,076 A | 11/1973 | Keim |
| 3,855,158 A | 12/1974 | Petrovich |
| 3,899,388 A | 8/1975 | Petrovich |
| 4,129,528 A | 12/1978 | Petrovich et al. |
| 4,147,586 A | 4/1979 | Petrovich et al. |
| 4,222,921 A | 9/1980 | van Eenam |
| 4,258,103 A | 3/1981 | Hosmer et al. |
| 4,473,613 A | 9/1984 | Jaisle et al. |
| 4,646,634 A * | 3/1987 | Espe ........................... 101/32 |
| 5,595,828 A | 1/1997 | Weber |
| 5,780,369 A | 7/1998 | Allison et al. |
| 6,103,364 A | 8/2000 | Harris et al. |
| 6,402,871 B1 | 6/2002 | Canary |
| 6,551,694 B1 | 4/2003 | Imamichi et al. |
| 2002/0168508 A1 | 11/2002 | Reed et al. |
| 2007/0272381 A1 | 11/2007 | Elony et al. |
| 2009/0297781 A1 | 12/2009 | Huss et al. |

FOREIGN PATENT DOCUMENTS

| | | |
|---|---|---|
| GB | 2148793 | 6/1985 |
| WO | 2008036038 | 3/2008 |

* cited by examiner

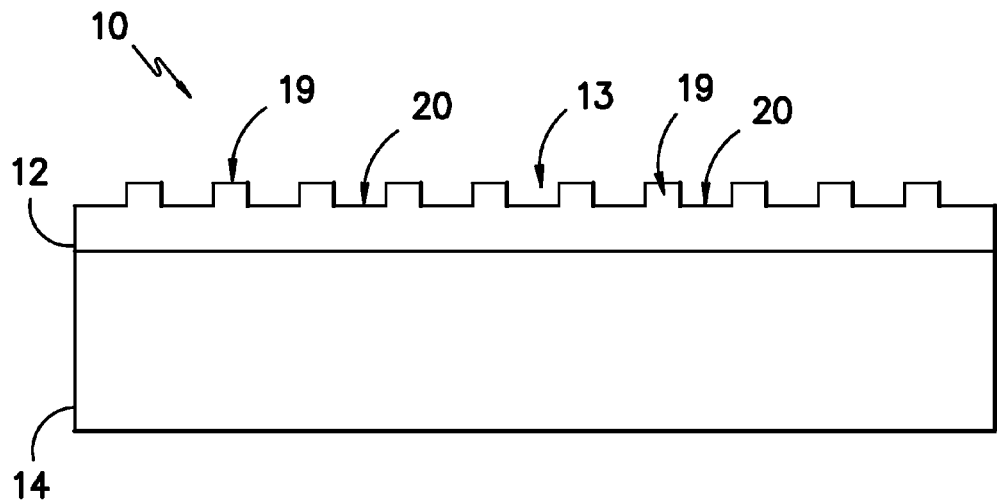
FIG. -1-
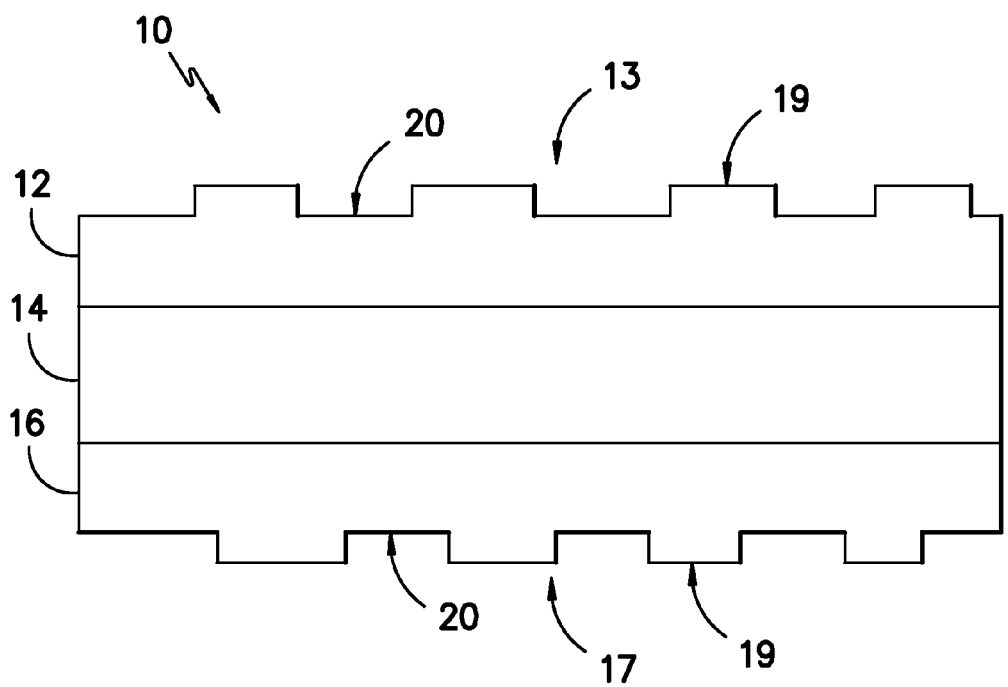
FIG. -2-

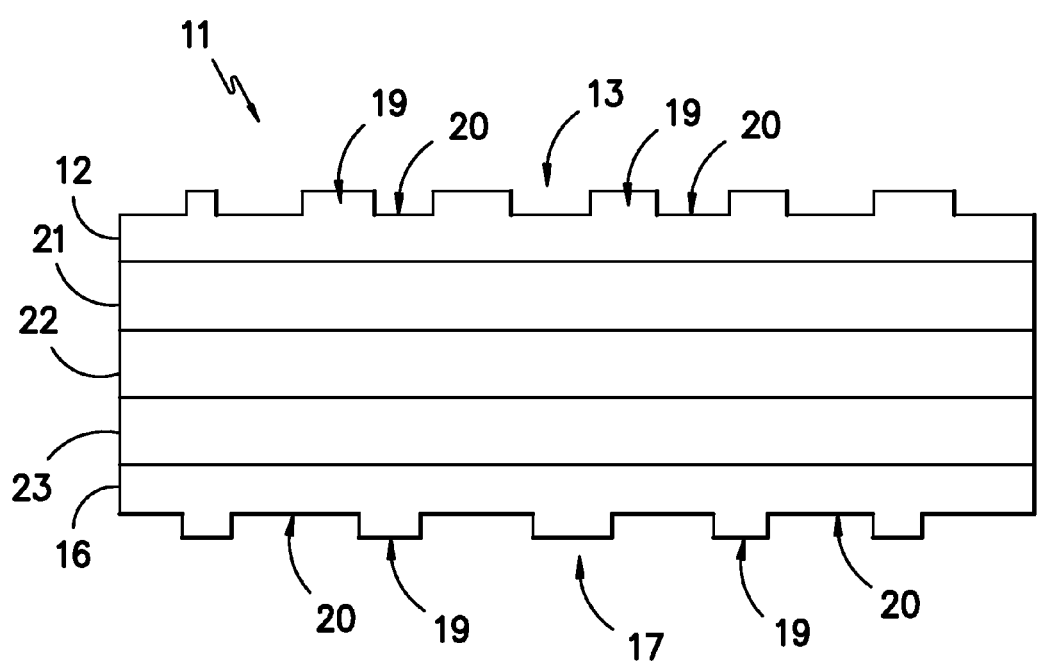
FIG. -3-

TEXTURIZED MOTTLED ARTIFICIAL CLOTHING LABEL AND METHODS OF MAKING THE SAME

PRIORITY INFORMATION

The present application claims priority to and is a divisional application of U.S. patent application Ser. No. 12/713,269 of Rueckert, et al. titled "Texturized Mottled Artificial Clothing Label and Methods of Making the Same" filed on Feb. 26, 2010, the disclosure of which is incorporated by reference herein.

BACKGROUND OF THE INVENTION

The reinforcement of paper by polymer impregnation (commonly referred to as latex saturation) is a long-established practice. The polymer employed typically is a synthetic material, most often a latex, and the paper may include cellulosic fibers or a mixture of cellulosic and noncellulosic fibers. Polymer reinforcement is employed to improve one or more of such properties as dimensional stability, resistance to chemical and environmental degradation, resistance to tearing, embossability, resiliency, conformability, moisture and vapor transmission, and abrasion resistance, among others.

Saturated papers typically have been used as label print stock, base substrates for abrasive papers, and similar applications where strength is an essential requirement. They have, however, found limited applicability in the preparation of clothing labels. This limited applicability stems from the aesthetics of the paper. For example, the surface of the paper looks like paper instead of the desired substrate that the clothing manufacturers are replacing (e.g., the paper is too thin/thick, a uniform color, and/or the surface is flat). To improve the aesthetics of the paper-based labels, attempts have been made to thicken the saturated paper and/or combine multiple papers together to form a laminate. However, these attempts have failed to produce a saturated paper having sufficient strength to withstand the normal wear and tear of the clothing. In particular, these attempts have failed to produce a saturated paper that can survive multiple wash cycles without delaminating or otherwise damaging the saturated paper. Additionally, the color of the sheet can be changed, but the sheet still is a uniform color that does not have the color variations expected in nature (i.e., in leather labels).

A need remains in the art, therefore, for a saturated paper that can have variable thickness, isn't a uniform color, and/or has a texturized surface to be useful as a clothing tag that can survive multiple washings without significantly affecting its appearance or function.

SUMMARY OF THE INVENTION

Aspects and advantages of the invention will be set forth in part in the following description, or may be obvious from the description, or may be learned through practice of the invention.

Laminates and methods of making them are generally provided. The method of making a laminate for use as a clothing tag can include texturizing a paper web including cellulosic fibers to provide a texturized outer surface. The paper web can be saturated with a first binder composition such that the first binder composition comprises from about 10% by weight to about 100% by weight of the dry weight of the paper web. The first binder composition can include a first curable latex polymer, a first crosslinker, and a pigment. The paper web can then be laminated to a base web to form a laminate such that the outer surface of the paper web forms an outer surface of the laminate. The base web can include cellulosic fibers and a second binder composition which is present in the base web from about 10% by weight to about 100% by weight based on the dry weight of the base web. The second binder composition comprises a second curable latex polymer and a second crosslinker, which may or may not be the same as the first binder composition. The laminate can then be aged for at least about 1 hour (e.g., for about 2 hours to about 10 hours) at an aging temperature of greater than about 150° F. (e.g., about 200° F. to about 350° F.).

In particular embodiments, the paper web can be texturized via embossing, molding, etc. to provide compressed areas and uncompressed areas in the paper web. The first binder composition can be saturated into the paper web unevenly such that a lesser amount of first binder composition is present in the compressed areas of the paper web compared to the amount of first binder composition present in the non-compressed areas of the paper web. Alternatively, the paper web can be texturized via creping the outer surface of the web, watermarking (or shadowmarking) the paper web to form thin areas, etc.

In one embodiment, an adhesive composition can be applied to at least one of the paper web and the base web and the paper web and the base web can be pressed together such that the adhesive composition is positioned between the paper web and the base web.

A laminate for use as a clothing tag is also generally provided. The laminate can include a texturized paper web containing of cellulosic fibers defining compressed areas and non-compressed areas forming a texturized outer surface laminated to a base web such that the texturized outer surface of the paper web forms an outer surface of the laminate. The texturized paper web is saturated with a first binder composition such that the first binder composition is present in the paper web from about 10% by weight to about 100% by weight of the dry weight of the paper web. The first binder composition comprises a first curable latex polymer, a first crosslinker, and a pigment. The base web includes cellulosic fibers and a second binder composition present in the base web from about 10% by weight to about 100% by weight based on the dry weight of the base web. The second binder composition comprises a second curable latex polymer and a second crosslinker, which may or may not be the same as in the first binder composition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 1 shows an exemplary laminate 10 formed from a texturized paper web 12 laminated to a base web 14;

FIG. 2 shows another exemplary laminate 10 having a second outer web 16 defining an outer surface 17 that is opposite from the outer surface 13 defined by the texturized paper web 12; and FIG. 3 shows yet another exemplary laminate 11 that includes five webs laminated together.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to saturated paper laminates and their use as clothing labels. These saturated paper laminates can survive multiple wash cycles without significantly affecting its appearance or function. Thus, the saturated paper laminates are particularly useful as clothing labels. As used herein, the term "clothing" refers not only to garments but also to other fabric based products having a label applied and subject to repeated wet and dry cycles, including but not limited to backpacks, luggage, etc.

The presently disclosed saturated paper laminates can also be formed to have a desired texture and/or colored contrast in the texture. Additionally, the unique properties of the presently disclosed saturated paper laminates can provide exceptional strength, printability, and durability while maintaining drapeability. In one particular embodiment, the saturated paper laminates can be substituted for leather labels, since the paper laminates can be leather-like in appearance.

The presently disclosed saturated papers can provide excellent images with conventional printing processes (e.g., offset, screen, flexographic, dot matrix, hot stamp, laser printers, ink jet printers, etc.) and durable absorbance to printing inks and/or coatings. The presently disclosed saturated papers are also sewable, stone and enzyme washable, and heat and tear resistant. Thus, the presently disclosed saturated papers can provide the ease of processing with standard paper converting equipment accompanied with durability and lower cost to compete with leather, woven cloth, or polyurethane labels. In addition, compared to leather and polyurethane, the paper label can be more environmentally friendly in its production.

In particular, the presently disclosed saturated papers can be laminates formed from multiple paper layers (e.g., from 2 to about 5 paper sheets) laminated together. However, any number of saturated webs can be laminated together to form a laminate having the desired thickness. The number of webs laminated together can also depend on the thickness of the webs used to form the laminate.

FIG. 1 shows an exemplary laminate 10 formed from a texturized paper web 12 laminated to a base web 14. The texturized paper web 12 defines an outer surface 13 of the laminate 10 such that the outer surface 13 is texturized to define peaks 19 and valleys 20 in the outer surface 13. For example, when embossed, molded, or otherwise pressed, the valleys 20 in the outer surface 13 can be defined by compressed areas, and the peaks 19 can be defined by noncompressed areas. Alternatively, the peaks 19 and valleys 20 in the outer surface 13 can be defined by a creping pattern resulting from creping the outer surface 13. In other embodiments, the peaks 19 and valleys 20 in the outer surface 13 can be defined by a watermark or shadowmark in the texturized paper web 12, where peaks 19 and valleys 20 the valleys are defined by thicker areas and thinner areas, respectively, in the texturized paper web 12.

FIG. 2 shows another exemplary laminate 10 having a second outer paper web 16 defining an outer surface 17 that is opposite of the base web 14 from the outer surface 13 defined by the texturized paper web 12. This second outer paper web 16 can also be texturized such that the outer surface 17 can also provides a texturized surface having peaks 19 and valleys 20 on the laminate opposite the outer surface 13. FIG. 3 shows yet another exemplary laminate 11 that includes five webs laminated together. Essentially, this embodiment is similar to the exemplary laminate shown in FIG. 2, except that the base web 14 is made of a laminate of a first base web 21, a second base web 22, and a third base web 23.

An adhesive composition can be included between the layers of the laminate 10 in any of the exemplary embodiments shown in FIGS. 1-3.

This laminate can withstand the normal environments experienced by typical clothings (e.g., repeated wear and wash cycles) to sufficiently provide a lasting label for the clothing.

I. Paper Webs

The individual layers of the saturated paper laminate may generally be formed from a variety of different materials as is well known in the art. In one embodiment, for example, the base sheet and the outer layer(s) contain a fibrous web formed from a cellulosic fibrous material. As used herein, the term "cellulosic fibrous material" generally refers to a material that contains wood based-pulps or other non-wood derived fiber sources (e.g., at least about 50% by weight of the total fibers in the web are cellulosic).

The pulp may be a primary fibrous material or a secondary fibrous material ("recycled"). Sources of pulp fibers include, by way of example, woods, such as softwoods and hardwoods; straws and grasses, such as rice, esparto, wheat, rye, and sabai; canes and reeds, such as bagasse; bamboos; woody stalks, such as jute, flax, kenaf, and cannabis; bast, such as linen and ramie; leaves, such as abaca and sisal; and seeds, such as cotton and cotton liners. Softwoods and hardwoods are the more commonly used sources of cellulose fibers. Examples of softwoods include, by way of illustration only longleaf pine, shortleaf pine, loblolly pine, slash pine, Southern pine, black spruce, white spruce, jack pine, balsam fir, douglas fir, western hemlock, redwood, and red cedar. Examples of hardwoods include, again by way of illustration only, aspen, birch, beech, oak, maple, eucalyptus, and gum. Specific examples of such pulp fibers include softwood pulps available under the trade designation LL-19 from Buchanon Industries and INTERNATIONAL PINE® from International Paper Company. Other cellulosic fibers that may be used the present invention include eucalyptus fibers, such as Primacell Eucalyptus, available from Klabin Riocell, and other hardwood pulp fibers available under the trade designations St. Croix hardwood available from Georgia-Pacific Corporation, and Leaf River hardwood available from Georgia-Pacific Corporation.

The pulp fibers may generally be chemical or mechanical pulp. Chemical pulp refers to fibrous materials from which most non-cellulose components are removed by chemical pulping without substantial mechanical post-treatment. Sulfite or sulfate (Kraft) chemical processes, for example, involve the dissolution of the lignin and hemi-cellulose components from the wood to varying degrees depending on the desired application. Mechanical pulp refers to fibrous materials made of wood processed by mechanical methods. Mechanical pulp is subdivided into the purely mechanical pulps (e.g., groundwood pulp and refiner mechanical pulp) and mechanical pulps subjected to chemical pretreatment (e.g., chemimechanical pulp or chemithermomechanical pulp). Synthetic cellulose-containing fibers may also be used, such as cellulosic esters, cellulosic ethers, cellulosic nitrates, cellulosic acetates, cellulosic acetate butyrates, ethyl cellulose, regenerated celluloses (e.g., viscose, rayon, etc.).

Different cellulosic fibers may be selected to provide different attributes. The choice of fiber sources depends in part on the final application of the web. For example, softwood fibers may be included in the web to increase tensile strength. Hardwood fibers may be selected for their ability to improve formation or uniformity in distribution of the fibers. The base webs of the presently disclosed laminates can be, in certain embodiments, at least about 75% by weight softwood fibers (based on the total dry weight of the cellulosic fibers in the web), such as at least about 95% by weight (i.e., from about 95% by weight to about 100% by weight). In one particular embodiment, softwood fibers can form substantially 100% by weight of the total cellulosic fibers in the web (i.e., consist essentially of softwood cellulosic fibers) without the presence of any significant amount of hardwood fibers.

In particular embodiments, cellulosic fibrous material can make up at least about 75% by weight of the total fibers in the web (based on the total dry weight of the fibers in the web), such as at least about 95% by weight. In one particular embodiment, cellulosic fibrous material can form substantially 100% by weight of the total fibers in the web (i.e., consist essentially of cellulosic fibers) without the presence of any significant amount of other non-cellulosic fibers.

However, if desired, synthetic fibers may also used in conjunction with the cellulosic fibers to increase the tear resistance of the fibrous web in certain embodiments. Examples of such synthetic fibers may include, for instance, polyolefins (e.g., polyethylene, polypropylene, polybutylene, etc.); polytetrafluoroethylene; polyesters (e.g., polyethylene terephthalate); polyvinyl acetate; polyvinyl chloride acetate; polyvinyl butyral; acrylic resins (e.g., polyacrylate, polymethylacrylate, polymethylmethacrylate, etc.); polyamides (e.g., nylon 6, nylon 6/6, nylon 4/6, nylon 11, nylon 12, nylon 6/10, and nylon 12/12); polyvinyl chloride; polyvinylidene chloride; polystyrene; polyvinyl alcohol; polyurethanes; polylactic acid; and so forth. The synthetic fibers may be monocomponent or multicomponent fibers. One example of a multicomponent fiber is comprised of two fibers having differing characteristics combined into a single fiber, commonly called a biocomponent fiber. Bicomponent fibers generally have a core and sheath structure where the core polymer has a higher melting point than the sheath polymer. Other bicomponent fiber structures, however, may be utilized. For example, bicomponent fibers may be formed with the two components residing in various side-by-side relationships as well as concentric and eccentric core and sheath configurations. One particular example of a suitable bicomponent fiber is available from KoSa under the designation CELBOND® T-255. CELBOND® T-255 is a synthetic polyester/polyethylene bicomponent fiber capable of adhering to cellulosic fibers when its outer sheath is melted at a temperature of approximately 128° C. When utilized, the synthetic fibers typically constitute from about 0.1% to about 25%, in some embodiments from about 0.1% to about 20%, and in some embodiments, from about 0.1% to about 10% of the dry weight of the web.

The web may be formed by distributing the suspension onto a forming surface (e.g., wire) and then removing water from the distributed suspension to form the web. This process may involve transferring the fiber suspension to a dump chest, machine chest, clean stock chest, low density cleaner, headbox, etc., as is well known in the art. Upon formation, the fibrous web may then be dried using any known technique, such as by using convection ovens, radiant heat, infrared radiation, forced air ovens, and heated rolls or cans. Drying may also be performed by air drying without the addition of thermal energy.

Optionally, the base sheet can be calendered. Calendering a base sheet can increase the softness and smoothness of the sheet. When desired, the base sheet can be calendered according to any process. Calendering generally involves pressing the base sheet in a nip formed by a first and second calendering rolls.

Various additives may be applied to the cellulosic fibrous material during formation of the fibrous web. For example, wet-strength agents may be used to improve the strength properties of the web during formation. The wet-strength agents may be present in an amount from about 0.001 wt. % to about 5 wt. %, in some embodiments from about 0.01 wt. % to about 2 wt. %, and in some embodiments, from about 0.1 wt. % to about 1 wt. %, based on the dry weight of the fibers. Wet-strength agents are typically water soluble, cationic oligomeric or polymeric resins that are capable of bonding with the cellulosic fibers. For example, some suitable wet-strength agents are polyamine-epichlorohydrin, polyamide epichlorohydrin or polyamide-amine epichlorohydrin resins (collectively "PAE" resins). Examples of these materials are described in U.S. Pat. No. 3,700,623 to Keim and U.S. Pat. No. 3,772,076 to Keim, which are incorporated herein in their entirety by reference thereto for all purposes. Suitable PAE resins are available from Ashland, Inc. (Covington, Ky.) under the designation "KYMENE®" (e.g., KYMENE® 557H or 557 LX). KYMENE® 557 LX, for example, is a polyamide epicholorohydrin polymer that contains both cationic sites, which may form ionic bonds with anionic groups on the pulp fibers, and azetidinium groups, which may form covalent bonds with carboxyl groups on the pulp fibers and crosslink with the polymer backbone when cured. Other suitable polyamide-epichlorohydrin resins are described in U.S. Pat. No. 3,885,158 to Petrovich; U.S. Pat. No. 3,899,388 to Petrovich; U.S. Pat. No. 4,129,528 to Petrovich; U.S. Pat. No. 4,147,586 to Petrovich; and U.S. Pat. No. 4,222,921 to van Eanam, which are incorporated herein in their entirety by reference thereto for all purposes.

Of course, other wet strength agents may also be employed in certain embodiments of the present invention. For example, other suitable wet strength agents may include dialdehyde starch, polyethylene imine, mannogalactan gum, glyoxal, and dialdehyde mannogalactan. Particularly useful wet-strength agents are water-soluble polyacrylamide resins available from Cytec Industries, Inc. of West Patterson, N.J. under the designation PAREZ® (e.g., PAREZ® 631 NC). The PAREZ® resins are formed from a polyacrylamide-glyoxal polymer that contains cationic hemiacetal sites. These sites may form ionic bonds with carboxyl or hydroxyl groups present on the cellulosic fibers to provide increased strength to the web. Because the hemiacetal groups are readily hydrolyzed, the wet strength provided by the resins is primarily temporary. Such resins are believed to be described in U.S. Pat. No. 3,556,932 to Coscia, et al. and U.S. Pat. No. 3,556,933 to Williams, et al., which are incorporated herein in their entirety by reference thereto for all purposes.

The basis weight of the webs can be any basis weight useful for providing a label base sheet, such as from about 10 gsm to about 200 gsm or greater. For example, in some embodiments, the webs can have a basis weight of from about 20 gsm to about 85 gsm, such as from about 25 gsm to about 65 gsm.

The paper webs for use as outer layers in the laminate may have a relatively small thickness compared to the thickness of the base sheet. For example, the outer paper web can have a thickness up to about 8 mils, such as about 2 mils to about 6 mils. For example, the outer paper web can have a thickness of about 3 mils to about 4 mils. The base sheet can have a relatively larger thickness, compared to the outer paper web. Thus, the base sheet can provide structural support for the outer, texturized paper web. The base sheet can have a thickness of about 5 mils to about 30 mils, such as about 8 mils to about 20 mils.

II. Texturized Paper Web

The webs used to form the outer surface(s) of the laminate can be texturized to provide a surface texture to the resulting laminate. As such, the laminate can have a look and feel of a non-paper label (e.g., can be leather-like in appearance and feel).

In some embodiments, the texturized paper web can be creped, before or after drying. Generally, conventional creping techniques reduce internal bonding within the web and increase softness, along with providing a surface texture to the creped side of the web. Any process for creping the paper web can be utilized in accordance with the present invention. For example, the paper web can be creped according to a conventional wet-laid and creping process. According to this process, the paper web is first wet-laid on a forming fabric from the pulp fibers. From the forming fabric, the formed paper web can be transferred to a second fabric, such as a wire fabric or a felt fabric. Then, from the second fabric, the paper web can be pressed onto the surface of a rotatable, heated dryer drum, such as a Yankee dryer, by a press roll. As such, the paper web is lightly pressed into engagement with the surface of the dryer drum to which it adheres, due to its moisture content or due to an optional binder material that has been previously applied. As the wet web is carried through a portion of the rotational path of the dryer surface, heat is imparted to the paper web causing most of the moisture contained within the paper web to be evaporated. The paper web is then removed from the dryer drum by a creping blade. The creped surface of the paper web typically exhibits a recognizable creped pattern defining peaks and valleys in the creped surface of the base sheet.

In addition, or in the alternative, the paper web can embossed, molded, or otherwise pressed with a pattern to form compressed and non-compressed areas in the thickness of the web. The embossed pattern can be visible in one or both of the surfaces of the base sheet. When embossed after drying, the compressed and non-compressed areas of the web can have differing fiber densities, such that the compressed areas have a greater fiber density than the non-compressed areas.

In certain embodiments, the base sheet can include a watermark, shadow mark, or other thickness variation in one or both of the surfaces of the base sheet to form a distinctive repetitive or random pattern that varies the thickness of the base sheet. Watermarks and shadow marks can be produced by inducing localized variations in the thickness of the cellulosic web (e.g., a thinner portion of the base sheet defines the watermark). This variation in thickness, in turn, creates localized variations in the opacity of the paper, and so creates a contrast which makes the watermark visible, particularly in transmitted light. The desired localized variation in web thickness can be effected by fiber displacement by means of a dandy roll which runs on top of the wet web on the wire of a Fourdrinier paper machine. The dandy roll can imprint the desired image into the wet web creating variations in thickness that define a watermark or shadow mark. For example, the dandy roll can have protrusions (to form watermarks) or depressions (to form shadow marks) that create the variation in thickness during the web formation process (e.g., while the web is still wet) resulting in the variation in transparency. Since the watermark or shadow mark is formed while the web is still wet, the fibers have the ability to move within the web, resulting in thickness variations without significant change in fiber density throughout the web. As such, the watermarked or shadow marked paper can have substantially constant fiber density throughout the web, including through the relatively thick and thin areas.

The resulting texturization formed in the paper web can be readily seen even after the saturant composition is saturated into the paper web.

III. Binder Composition

In accordance with the present invention, each layer of the laminate is saturated with a binder composition after formation of the web and prior to the lamination of multiple base webs together. In one particular embodiment, the outermost web forming an external surface of the laminate can be saturated with the binder composition after the texturizing the paper web. The binder composition can further improve the strength properties of the fibrous web. The binder composition, when applied to a texturized web forming an outer surface of the laminate, can increase the lamination strength of the layers of the laminate.

In accordance with the present invention, the binder composition includes a curable latex polymer. As used herein, the term "latex polymer" refers to an emulsion of the polymer in a solvent (typically water). The curable latex polymers are configured to cure upon the application of heat and/or pressure creating a stronger form of the polymer material, such as a crosslinked 3-dimensional structure. Suitable latex polymers include, but are not limited to polyacrylates, including polymethacrylates, poly(acrylic acid), poly(methacrylic acid), and copolymers of the various acrylate and methacrylate/ethylacrylate/butylacrylate esters and the free acids; styrene-butadiene copolymers; ethylene-vinyl acetate copolymers; nitrile rubbers or acrylonitrile-butadiene copolymers; poly(vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers.

Specific examples of suitable latex polymers include polyacrylate binders available under the designations HYCAR® 26469, 26552, and 26703 from Lubrizol Advanced Materials (Ohio). Another suitable latex polymer is an acrylic latex available from Rohm & Haas of Philadelphia, Pa. under the designation Rhoplex B15.

In one embodiment, the latex polymer can include functionalized groups configured to facilitate curing of the latex polymer. For example, the latex polymer can include, but are not limited to, carboxyl groups, amine groups, and pyridyl groups. Without wishing to be bound by theory, it is believed that these functionalized groups can facilitate the curing of the latex polymer, as well as the crosslinking, by the presence of the polar groups on the latex polymer.

In one particular embodiment, a carboxylated latex polymer is present in the binder composition. The carboxylated latex polymer can be a copolymer product of the polymerization of a vinyl aromatic monomer and an unsaturated carboxylic acid monomer. The copolymer may further comprise a diene monomer.

Useful vinyl aromatic monomers include, but are not limited to, styrene, alpha-methylstyrene, ethylstyrene, dimethylstyrene, t-butylstyrene, vinylnaphthalene, methoxystyrene, cyanostyrene, acetylstyrene, monochlorostyrene, dichlorostyrene, and other halostyrenes, and mixtures thereof. The vinyl aromatic monomer may be present in any effective amount, such as greater than 0% to about 75% by weight, based on the total weight of the polymer resin. In some embodiments, the vinyl aromatic monomer is present in amounts of from about 35% to about 70% by weight. For example, in one particular embodiment, the vinyl aromatic monomer can be present from about 55% to about 60% by weight.

The ethylenically unsaturated carboxylic acid may be a monocarboxylic acid, or a dicarboxylic acid or a polycarboxylic acid, such as, for example, acrylic acid, methacrylic acid, fumaric acid, maleic acid, itaconic acid, derivatives thereof, and mixtures thereof. The ethylenically unsaturated carboxylic acid monomer may be present in any amount, such as from about 0.5% to about 25% by weight, based on the total weight of the polymeric resin. In one embodiment, the ethylenically unsaturated acid monomer is present in amounts of from about 1% to about 5% by weight, such as from about 3% to about 5% by weight, based on the total weight of the copolymer.

Suitable diene monomers include, but are not limited to, butadiene, isoprene, divinylbenzene, derivatives thereof and mixtures thereof. In one particular embodiment, the diene monomer can be a 1,3-butadiene monomer. When present, the diene monomer may be present from greater than 0% to about 85% by weight, and in one embodiment is present from about 30% to about 65% by weight, based on the total weight of the polymer resin. For instance, in one particular embodiment, the diene monomer can be present from about 40% to about 45% by weight.

The latex polymer may also comprise additional ethylenically unsaturated monomeric components. Specific examples of such ethylenically unsaturated compounds include methyl methacrylate, ethyl acrylate, butyl acrylate, hexyl acrylate, 2-ethylhexyl acrylate, lauryl methacrylate, phenyl acrylate, acrylonitrile, methacrylonitrile, ethyl-chloroacrylate, diethyl maleate, polyglycol maleate, vinyl chloride, vinyl bromide, vinylidene chloride, vinylidene bromide, vinyl methyl ketone, methyl isopropenyl ketone, and vinyl ethyl ester. Derivatives thereof and/or mixtures thereof may be included.

The latex polymer of the binder composition can have a glass transition temperature (Tg) of less than about 20° C. For example, the glass transition temperature of the latex polymer of the binder composition can be less than about 10° C., such as less than about 5° C.

In one particular embodiment, a styrene-butadiene latex including carboxyl groups can be included in the binder composition, such as the carboxylated styrene-butadiene latex sold as DL-240NA by Dow Chemical Company (Midland, Mich.), which has a Tg of about 2° C. Without wishing to be bound by theory, carboxylation of the latex polymer is believed to provide polar functional groups along the polymer chain. These polar functional groups can increase the ability of the latex polymer to crosslink upon curing, which can result in a strengthened, bonded polymer matrix formed upon curing.

The latex polymer can be provided in an emulsion, typically an aqueous emulsion. The solids content of the latex polymer emulsion can be from about 1% by weight to about 65% by weight, such as from about 10% to about 60%. In one particular embodiment, the solids content of the latex polymer emulsion is from about 40% to about 55% by weight.

In most embodiments, the latex polymer is crosslinked upon curing. For example, the latex polymer may be self-crosslinking, with the aid of a crosslinking agent. Alternatively, the latex polymer can be crosslinked to a crosslinking agent, such as a resin.

For example, in one particular embodiment, the latex polymer is crosslinked to an epoxy resin. The level of epoxy resin employed can vary over a wide range depending upon the types of epoxy resin and latex polymer used. For example, the epoxy resin can be from about 0.1% to about 50% by weight of the binder composition, such as from about 1% to about 10%. Thus, the ratio of the latex polymer to epoxy resin can be from about 1000:1 to about 2:1 by weight. Preferably, the ratio of the latex polymer to epoxy resin is from about 100:1 to about 20:1, by weight.

As used herein, "epoxy resin" includes any compound which possesses more than one 1,2-epoxy group. In general, the epoxy resin component is saturated or unsaturated aliphatic or cycloaliphatic, aromatic or heterocyclic and can be substituted or unsubstituted. The epoxy resins may be selected from the polyglycidyl ethers of bisphenol compounds, the polyglycidyl ethers of a novolac resin, and the polyglycidyl ethers of a polyglycol. For example, the epoxy resin can be polyglycidyl ethers of bisphenol compounds. Suitable polyglycidyl ethers can include bisphenol A or bisphenol F. In one particular embodiment, the epoxy resins may be formed as the reaction products of epichlorohydrin and bisphenol A or bisphenol F or derivatives thereof. For example, epoxy resins are available from Celanese (Dallas, Tex.), Hexion Specialty Chemicals (Houston, Tex.), Perry Chemical (Flushing, N.Y.) and NOVOC Performance Resins LLC (Sheboygan, Wis.).

Other useful epoxy resins include, but are not limited to, epoxy cresol-novolak resins; epoxy phenol-novolak resins; poly nuclear phenol-glycidyl ether-derived resins, such as the tetraglycidyl ether of tetrakis(4-hydroxyphenyl) ethane; resins containing an aromatic amine backbone, such as triglycidyl p-aminophenol-derived resins and triglycidyl triazine-derived resins such as triglycidyl isocyanurate.

Other suitable crosslinking agents include, but are not limited to aziridine oligomers having at least two aziridine functional groups (e.g., those commercially available from Lubrizol Advanced Materials, Inc. (Wickliffe, Ohio) and Nippon Shokubai Co. of Osaka, Japan), and phenolic crosslinkers (e.g., those commercially available from Bayer MaterialScience LLC (UAE), Cytec Industries (Woodland Park, N.J.)), Plenco (Sheboygan, Wis.,) and Reichhold, Inc. (Research Triangle Park, N.J.). Additionally, suitable crosslinking agents include melamine resins, such as those available from Cytec Industries (Woodland Park, N.J.).

Any known saturation technique may be employed, such as brushing, flooded nip saturation, doctor blading, spraying, and direct and offset gravure coating. For example, the web may be exposed to an excess of the solution and then squeezed. The squeezing of excess binder from the web may be accomplished by passing the web between rollers. If desired, the excess binder may be returned to the supply for further use. After squeezing out excess material, the saturated web may then be dried. Other suitable techniques for impregnating a web with a binder composition are described in U.S. Pat. No. 5,595,828 to Weber and U.S. Patent Application Publication No. 2002/0168508 to Reed, et al., which are incorporated herein in their entirety by reference thereto for all purposes. The amount of the binder composition applied may vary depending on the desired properties of the web, such as the desired permeability. Typically, the binder composition is present at an add-on level of from about 15% to about 100%, in some embodiments from about 40% to about 90%, and in some embodiments, from about 50% to about 85%. The add-on level is calculated, on a dry weight basis, by dividing the dry weight of binder composition applied by the dry weight of the web before treatment, and multiplying the result by 100.

In addition to the ingredients set forth above, various other additives may also be employed in the fibrous web. The additives may be applied directly the web or fibers, in conjunction with the binder composition or adhesive coating, or as a separate coating. By way of example, suitable additives may include antifoaming agents, pigments, processing aids, and dispersing agents. Examples of antifoaming agents include, but are not limited to, products such as NALCO® 7518 available from Nalco Chemical Company or DOW Corning® Antifoam available from Dow Corning Corporation. Dispersing agents or surfactants include, but are not limited to, products such as TAMOL® 731A available from Rohm & Haas Co., PLURONIC® F108 available from BASF Corporation, SMA® 1440 Resin available from ATOFINA Chemicals, Inc., and TERGITOL® 15S available from Union Carbide Corp. Examples of processing aids may include, but are not limited to, products such as NOPCOTE® DC-100A available from Geo Specialty Chemicals, Inc., SCRIPSET® 540 available from Solutia, Inc. and AQUAPEL® 752 available from Ashland, Inc. (Covington, Ky.). Examples of pigments used to increase opacity include but are not limited to, titanium dioxide such as TI-PURE® Rutile Titanium Dioxide available from E.I. Du Pont De Nemours & Co. and kaolin pigments, which are available from a variety of manufacturers. A wide range of pigments and dyes may also be added to impart color to the saturated sheet. The foregoing list of categories of additives and examples of categories is provided by way of example and is not intended to be exhaustive.

The application of a pigmented binder composition during saturation to a paper-based web with areas of variable fiber density can impart unique color tonalities to the web. For example, these unique color tonalities in the web can be realized by saturating a creped base sheet, a watermarked base sheet, an embossed base sheet, a wet-laid base sheet, and other base sheets formed with variable thickness throughout the sheet. Thus, the presently disclosed saturated papers can provide a mottled appearance even when a single shade of pigment (or other dye) is applied to the web.

IV. Lamination

A plurality of the saturated base sheets can be laminated together to form the laminate useful as a clothing label. In one particular embodiment, the texturized paper web can be positioned to define the outermost surface of the laminate, ensuring that the laminate has a texturized surface of peaks and valleys.

The saturated webs can be, in one particular embodiment, laminated together using an adhesive composition between each of the layers. In one particular embodiment, the adhesive composition can be a nitrile adhesive or an acrylic adhesive. Examples of the adhesives would be include but are not limited to Nychem 1552x67 from Emerald Performance Materials, (Akron, Ohio), Nychem 1552 from Emerald Performance Materials, (Akron, Ohio), and Cartabond AE960 from Lubizol Advanced Materials (Ohio). Typically, the adhesive can be present at an add-on level of 15 gsm to 55 gsm, in some embodiments from about 20 gsm to 50 gsm, and in some embodiments from about 25 gsm to 40 gsm. The add-on level is calculated from the dry weight of adhesive added between the laminate layers. The adhesive composition can be added to the internal surface of either or both of the texturized paper web and base sheet.

After formation, the laminate can be aged for at least about 1 hour (e.g., from about 2 hours to about 10 hours) at an aging temperature of greater than about 150° F. (e.g., from about 200° F. to about 350° F.). Without wishing to be bound by any particular theory, it is believed that aging the laminate allows for the latex polymer within the laminate webs to cure to the laminate adhesive layer resulting in a cured latex polymer that is sufficiently crosslinked to provide a strong laminate.

EXAMPLES

Wash Test:

From the desired sheet(s) to be wash tested, 10 samples are cut that are 2.5" by 2.5" square. Both sides of the sheet are marked with a permanent marker designating the sample identification. A 1 liter beaker is filled with 400 ml of cold water. 50% sodium hydroxide is added to the beaker of water until the pH is 12.0. The beaker is placed on a hot plate with an automatic temperature control system, and the water is heated to 60° C. (+/−5°. After the water has reached 60° C. temperature, paper samples are added to the beaker one at a time to soak for 45 minutes while keeping samples completely submerged. After soaking, the samples are transferred to a British Disintegrator (The Hermann Manufacturing Co., Standard Apparatus for Pulp Evaluation), a standard laboratory tool used to disintegrate paper into individual fibers without shortening fiber length and without refining fibers. 600 ml of hot water and 25 ml of household bleach are also added to the British Disintegrator. The disintegrator is covered and then energized to begin agitating the samples to simulate a washing machine. After a set amount of time, the disintegrator is shut off and the samples are removed and inspected for delamination, ripping, or other signs of sample failure. The time that the samples are agitated is dependent upon the grade design, saturant add-on level, and pigment load (10 minutes minimum to a maximum of 45 minutes). Unless otherwise specified, the disintegrator was operated with 10 samples regardless of basis weight, and samples were evaluated for failure at 10, 15, 24, and 36 minutes of beating time.

A sample fails the wash test if it has delamination in one corner or edge of the sample greater than 25 mm, or 2-4 corners with greater than 10 mm of delamination, or a tear in the sample greater than 20 mm, or one surface of the sheet being totally abraded (scuffed).

Comparative Example 1

A coarse black creped paper (grade 0936B0, available from Neenah Paper, Inc, Alpharetta, Ga.) was laminated to a black wash tag (grade 0258P0, available from Neenah Paper, Inc, Alpharetta, Ga.) in an attempt to add texture to the wash tag. The black wash tag was saturated with 65 parts add-on of a carboxylated SBR and phenolic crosslinker and then cured while the crepe sheet was saturated with 10 parts add-on of a different carboxylated SBR with no additional curing. The sheets were laminated together with 35 gsm Nychem 1552x67 and aged in a 127° C. (260° F.) oven for 6 hours. However, the crepe part of the laminate could not survive the wash test, and crepe surface was totally abraded during agitation.

Example 1

The same materials as used in Example 1 were used to make a laminate, except that the creped paper was saturated with 50 parts add-on of a carboxylated SBR and phenolic crosslinker with tan colored pigments. The wash tag sheet was saturated with 65 parts add-on of a carboxylated SBR and phenolic crosslinker with tan colored pigments. The sheets were laminated together with 35 gsm of Nychem 1552x67.

After lamination, the laminate was aged for 6 hours at 127° C. This laminate survived the wash test.

Comparative Example 2

A flat paper sheet (grade 0407B0, thickness of about 22 mils, available from Neenah Paper, Inc, Alpharetta, Ga.) was saturated with 50 parts add-on of a carboxylated SBR and phenolic crosslinker with tan colored pigments. The saturated paper sheet was then embossed. This sheet was not laminated.

After washing, the sample passed the wash test, but the sample did not retain its embossments. In fact, it could not be differentiated from an otherwise identical sheet that had not been embossed after being subjected to the same wash cycles.

Comparative Example 3

A flat paper sheet (grade 0407B0, thickness of about 22 mils, available from Neenah Paper, Inc, Alpharetta, Ga.) was embossed to provide compressed and non-compressed regions, where the compressed regions have a greater fiber density than the non-compressed regions.

The embossed base was then saturated with 50 parts add-on of a carboxylated SBR and phenolic crosslinker, and aged for 6 hours at 127° C. The pigment did not saturate into the compressed regions as well as the non-compressed regions, resulting in the desirable color variations in the sheet. This sheet was not laminated.

This Example passed the wash test but showed substantial loss of the embossed pattern.

Example 2

A flat paper sheet (grade 0011B0, thickness of about 6 mils, available from Neenah Paper, Inc, Alpharetta, Ga.) was embossed to provide compressed and non-compressed regions, where the compressed regions have a greater fiber density than the non-compressed regions. The embossed sheet was saturated with 50 parts add-on of a carboxylated SBR and phenolic crosslinker, and a pigment. The pigment did not saturate into the compressed regions as well as the non-compressed regions, resulting in the desirable color variations in the sheet.

The embossed, saturated sheet was laminated to a base sheet (grade 7160P0, thickness of about 19 mils, available from Neenah Paper, Inc, Alpharetta, Ga.). The base sheet was saturated with 50 parts add-on of a carboxylated SBR and phenolic crosslinker, and laminated to the embossed sheet prior to aging either sheet.

The sheets were laminated together with 35 gsm of Cartabond AE960.

The laminate was aged for 6 hours at 127° C.

This Example withstood the wash test and passed without significant delamination while substantially retaining the embossment pattern of the outer paper sheet.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A laminate for use as a clothing tag, the laminate comprising:
    an texturized paper web comprising cellulosic fibers defining compressed areas and non-compressed areas forming a texturized outer surface, wherein the paper web is saturated with a first binder composition such that the first binder composition is present in the paper web from about 10% by weight to about 100% by weight of the dry weight of the paper web, and wherein the first binder composition is saturated into the paper web unevenly such that a lesser amount of first binder composition is present in the compressed areas of the paper web compared to the amount of first binder composition present in the non-compressed areas of the paper web, wherein the first binder composition comprises a first curable latex polymer, a first crosslinker, and a pigment; and
    a base web laminated to the paper web to form a laminate such that the texturized outer surface of the paper web forms an outer surface of the laminate, wherein the base web comprises cellulosic fibers and a second binder composition present in the base web from about 10% by weight to about 100% by weight based on the dry weight of the base web, wherein the second binder composition comprises a second curable latex polymer and a second crosslinker.

2. The laminate as in claim 1, wherein compressed areas of the paper web appear a different color than the non-compressed areas of the paper web due to the uneven saturation of the paper web.

3. The laminate as in claim 1, wherein the first curable latex polymer comprises a styrene-butadiene rubber and the first crosslinker comprises a phenolic crosslinking agent.

4. The laminate as in claim 1, wherein the first curable latex polymer comprises a styrene-butadiene rubber and the first crosslinker comprises a melamine crosslinking agent.

5. The laminate as in claim 1, wherein the first curable latex polymer comprises an acrylic latex polymer and the first crosslinker comprises an epoxy resin.

6. The laminate as in claim 1, wherein the first curable latex polymer comprises an acrylic latex polymer and the first crosslinker comprises a melamine crosslinking agent.

7. The laminate as in claim 1, further comprising:
    an adhesive between the paper web and the base web.

* * * * *